INVENTORS
LARRY G. BERGLUND
ROBERT P. NOVAK
BY Arthur O. Andersen
ATTORNEY

Sept. 16, 1969   L. G. BERGLUND ET AL   3,466,894
ABSORPTION REFRIGERATING SYSTEM
Filed Jan. 5, 1968   2 Sheets-Sheet 2

INVENTORS
LARRY G. BERGLUND
ROBERT P. NOVAK
BY Arthur O. Andersen
ATTORNEY

United States Patent Office 3,466,894
Patented Sept. 16, 1969

3,466,894
ABSORPTION REFRIGERATING SYSTEM
Larry G. Berglund and Robert P. Novak, La Crosse, Wis., assignors to The Trane Company, La Crosse, Wis., a corporation of Wisconsin
Filed Jan. 5, 1968, Ser. No. 696,012
Int. Cl. F25b 15/06, 41/00
U.S. Cl. 62—476                                                                 10 Claims

ABSTRACT OF THE DISCLOSURE

Absorption refrigerating system having a pump which comprises two impellers mounted on a single shaft with one impeller circulating refrigerant and the other impeller circulating absorbent solutions of different concentrations and having a rotary seal between the two impellers.

It is an object of this invention to mount three pumps of an absorption refrigeration system in a single body and to drive the three pumps from one end of a shaft which is driven by a hermetic motor.

It is another object of the invention to provide an impeller having a partition to provide inlets for two fluids on the same side of the impeller, a second impeller for a third fluid with said second impeller in back to back relationship with said first impeller, a shaft for supporting said impellers and a rotary seal on said shaft between the two impellers.

It is another object to provide an absorption refrigeration system having a pump which has a first impeller having concentric nested passageways for pumping a dilute absorbent solution in one passageway and a more concentrated solution in the other passageway and a second impeller in back to back relationship with said first impeller for pumping the refrigerant of the absorption system.

Other objects and advantages of the invention will become apparent as the specification proceeds to describe the invention with reference to the accompanying drawings in which.

This invention relates to systems of the type described in Patent No. 2,986,906 granted June 6, 1961, to E. M. Stabblefield et al. Reference is made to such patent for a more complete description of the system.

Figure 1:
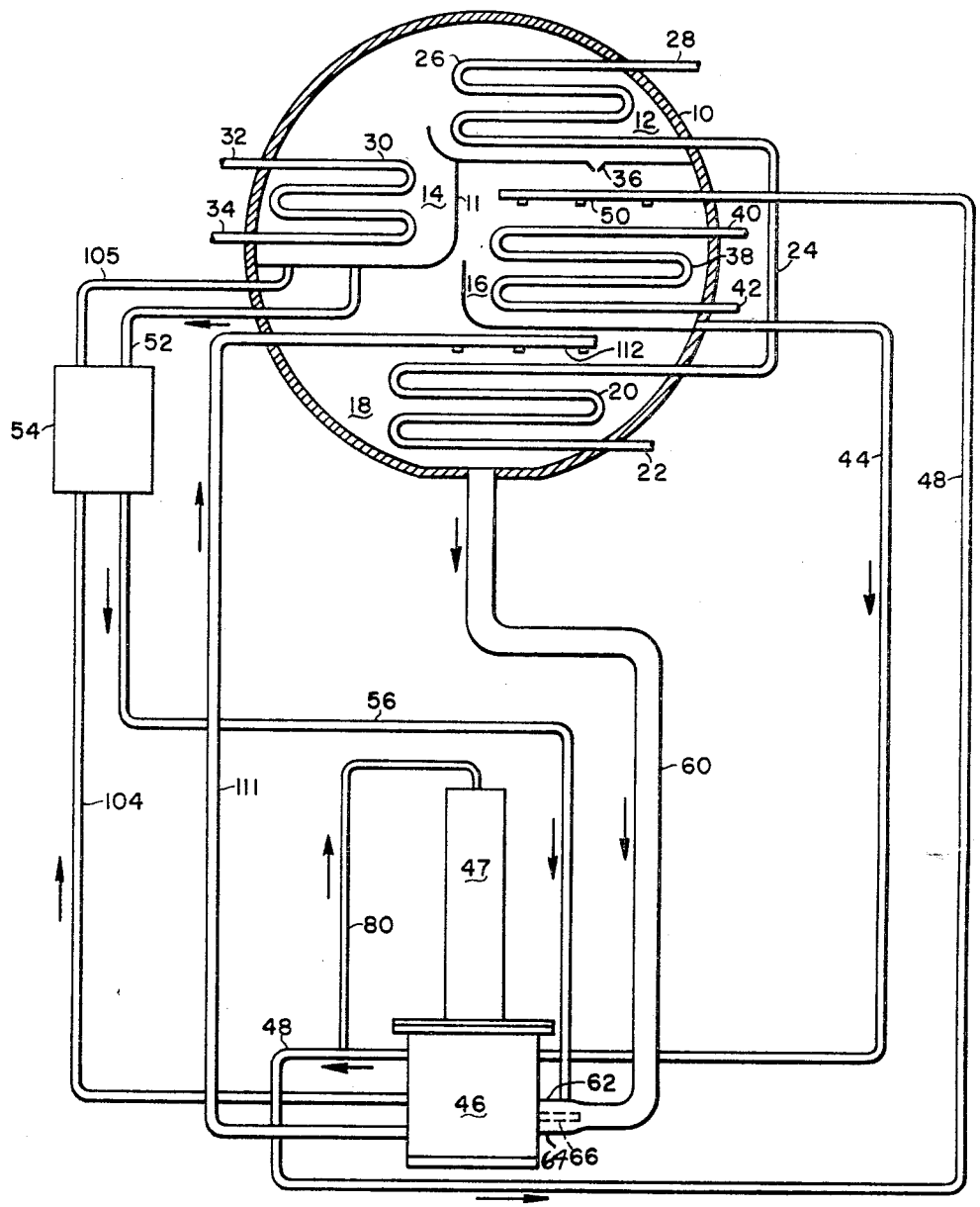
FIGURE 1 is a diagrammatic view of an absorption system according to this invention.
Figure 2:
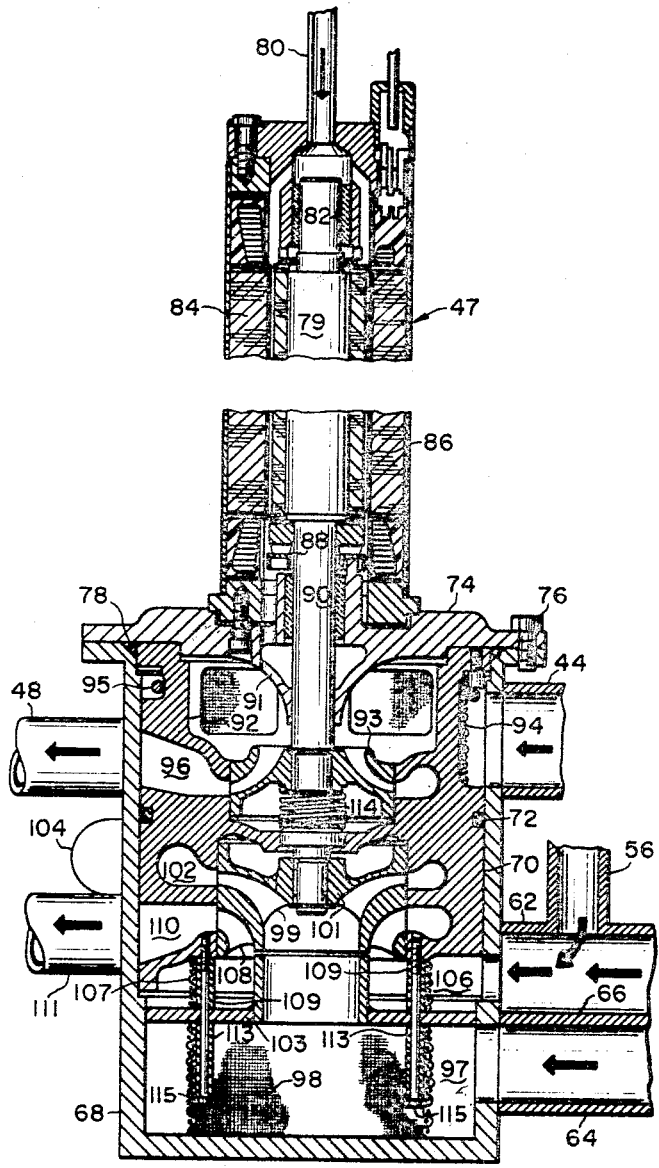
FIGURE 2 is an enlarged cross-sectional view of the pump and motor of the absorption system of FIGURE 1.

Referring now to FIGURE 1, the absorption system shown is of the type having a single shell 10 with a partition 11 separating a high pressure chamber containing a condenser 12, and a generator 14 from a low pressure chamber containing an evaporator 16 and an absorber 18. It should be understood that other arrangements might be used; for instance, the generator and the condenser might be in one shell and the absorber and evaporator might be in a second shell with conduits therebetween for conducting fluids.

Various combinations of refrigerant and absorbent may be used. A solution of lithium bromide and water has been found to be highly satisfactory for use.

The absorber 18 has a coil 20 supplied with cooling fluid from a source 22 to remove heat from the absorber. This cooling fluid is conducted by a conduit 24 to a cooling coil 26 in the condenser 12 and the cooling fluid leaves the machine through a conduit 28. The cooling coil 26 in the condenser 12 removes heat from and condenses the refrigerant vapor in the condenser.

The generator 14 has a heating coil 30 supplied with heating fluid from a source 32. The heating fluid is discharged from the coil 30 through a conduit 34. The coil 30 heats the absorbent solution in the generator causing it to boil and force refrigerant vapor into the condenser 12. The condensed refrigerant in the condenser 12 flows through an opening 36 into the evaporator 16. The absorbent solution in the absorber 18 reduces the pressure in the absorber 18 and in the evaporator 16 by the absorption of refrigerant vapor, thus causing the refrigerant in the evaporator 16 to boil. A low temperature is thus maintained in the evaporator 16.

Evaporator 16 has a coil 38. Fluid from a refrigerating load such as an air conditioning system enters the coil 38 through a conduit 40. This fluid is reduced in temperature in the coil 38 and returns to the refrigerating load through conduit 42. The liquid refrigerant in the evaporator 16 flows through a conduit 44 to a pump 46 which is driven by a motor 47. Pump 46 has a discharge conduit 48 for conducting the refrigerant discharge by the pump to a spray tree 50 in the evaporator 16.

Concentrated absorbent solution flows from generator 14 through conduit 52 to heat exchanger 54 and thence through conduit 56 to mix in conduit 62 with dilute solution flowing from absorber 18 through conduit 60. The mixed or intermediate solution flows from conduit 62 to the pump 46.

Dilute solution from conduit 60 flows through conduit 64 to the pump 46. A partition 66 separates conduit 62 from conduit 64.

Pump 46 has a casing 68 which encloses a pump body 70. An O-ring 72 of flexible material such as rubber seals the refrigerant portion of the pump from the absorbent solution portion of the pump. The motor 47 has an end wall 74 which is secured to the pump casing 68 by bolts 76. An O-ring 78 of flexible material such as rubber provides a seal between the flange 74 and the pump casing 68. A motor shaft 79 is rotatably mounted in bearings 82 and 90.

Refrigerant flows from conduit 48 through conduit 80 to the motor 47 to cool the motor and lubricate the bearings.

From conduit 80 the refrigerant flows over bearing 82 thence through the gap between the stator 84 and the rotor 86 to the thrust bearing 88. From this point, the refrigerant flows to bearing 90 and then through hole 91 to the suction chamber 92 serving the refrigerant impeller 93 which is secured to the motor shaft 79 for rotation thereby.

Suction chamber 92 is in fluid communication with and receives liquid refrigerant from conduit 44. A removable screen 94 interposed between conduit 44 and suction chamber 92 prevents dirt from entering the suction chamber. A garter type spring 95 holds the screen 94 in place. A volute passageway 96 receives refrigerant liquid discharge by impeller 93. Volute 96 is connected to discharge refrigerant into conduit 48.

Dilute solution flows from conduit 64 to suction chamber 97 from which it flows through a removable screen 98 to the passageways 99 of impeller 101 which is mounted on motor shaft 79 for rotation thereby. Volute passageway 102 receives dilute solution from passageways 99 and is connected to discharge the dilute solution to conduit 104 which conducts the dilute solution to heat exchanger 54. The dilute solution flows from heat exchanger 54 through conduit 105 to the generator 14.

Mixed or intermediate solution flows from conduit 62 to suction chamber 106 from which it flows through screen removable 107 to passageways 108 of impeller 101. Volute passageway 110 is connected to receive the intermediate solution from passageways 108 and to discharge the solution to conduit 111 through which it flows to the absorber sprays 112.

A rotary seal 114 is mounted on shaft 79 between impeller 93 and impeller 101 to prevent the flow of fluids therebetween.

Suction inlet 103 is held to pump body 70 by spacer tubes 109, spacer tubes 113 and bolts 115. The spacer tubes 109 locate and support screen 107. Spacer tubes 113 locate and support screen 98.

Although we have described specific embodiments of our invention, we contemplate that various modifications may be made without departing from the scope or spirit of our invention and we desire to be limited only by the claims.

We claim:

1. In an absorption refrigerating system, the combination of a generator, a condenser, refrigerant vapor from the generator flowing to the condenser, an evaporator, liquid refrigerant flowing from the condenser to the evaporator, an absorber, vapor from the evaporator flowing to the absorber to be absorbed therein, and means to circulate refrigerant and absorbent solution in said system comprising a pump assembly and a motor extending from one end of said pump assembly, said motor having a drive shaft extending into said pump assembly from the main portion of the motor, said pump assembly having a first impeller mounted on said drive shaft, means for conducting refrigerant liquid from the evaporator to said first impeller and from said first impeller to said evaporator, a second impeller mounted on said drive shaft and having a first passageway and a second passageway, means for conducting dilute absorbent solution to the first passageway of said second impeller and from the first passageway of said second impeller to the generator, means for conducting to the second passageway of said second impeller an intermediate absorbent solution comprising a mixture of dilute absorbent solution from the absorber and concentrated absorbent solution from the generator and for conducting the intermediate absorbent solution from the second passageway of said second impeller to the absorber, said first impeller being arranged on said drive shaft between said second impeller and main portion of the motor.

2. An absorption refrigerating system according to claim 1 in which said second impeller is in back to back relationship with said first impeller.

3. An absorption refrigerating system according to claim 1 in which said second passageway of said second impeller is arranged between the first passageway of said second impeller and said first impeller.

4. An absorption refrigerating system according to claim 1 further including a rotary seal mounted on the drive shaft between said first impeller and said second impeller.

5. An absorption refrigerating system according to claim 1 further including an end wall on said motor, said end wall being secured to said pump, means for conducting refrigerant from the discharge side of said first impeller to the end of the motor remote from the pump, means in said motor for conducting refrigerant liquid through the motor to cool and lubricate the motor, and means for conducting refrigerant through the end wall to the suction side of said first impeller.

6. An absorption refrigerating system according to claim 1 in which the second impeller is constructed and arranged so that said first passageway of said second impeller is nested within the second passageway of said second impeller.

7. In an absorption refrigerating system, the combination of a generator, a condenser, refrigerant vapor from the generator flowing to the condenser, an evaporator, liquid refrigerant flowing from the condenser to the evaporator, an absorber, vapor from the evaporator flowing to the absorber to be absorbed therein, and means to circulate refrigerant and absorbent in said system comprising a pump assembly and a motor extending from one end of said pump assembly, said motor having a drive shaft extending into said pump assembly from the main portion of the motor, said pump assembly having a refrigerant impeller mounted on said drive shaft, an absorbent impeller mounted on said drive shaft in back to back relationship with said refrigerant impeller, a unitary substantially cylindrical pump body having refrigerant inlet and volute passageways for said refrigerant impeller and absorbent inlet and volute passageways for said absorbent impeller, a casing having a substantially cylindrical bore for receiving and enclosing said pump body, means on said pump body and on said casing for sealing said refrigerant inlet and volute passageways from said absorbent inlet and volute passageways, means for conducting refrigerant liquid from said evaporator through said casing to the refrigerant inlet of said body, means for conducting refrigerant liquid from the volute of said refrigerant impeller through said casing to said evaporator, means for conducting absorbent from said absorber through said casing to the absorbent inlet of said body and means for conducting absorbent from the volute of said absorbent impeller through said casing to the absorber.

8. An absorption refrigerating system according to claim 7 further including as part of said pump assembly a rotary seal mounted on the drive shaft between said refrigerant impeller and said absorbent impeller.

9. An absorption refrigerating system according to claim 7 further including as part of said pump assembly means for conducting refrigerant from the discharge side of said refrigerant impeller to the end of the motor remote from the pump, means for conducting refrigerant through the motor to cool and lubricate the motor and means for conducting refrigerant from the motor to the suction side of the refrigerant impeller.

10. An absorption refrigerating system according to claim 7 in which said motor has an end wall, said end wall being secured to said pump, means for conducting refrigerant from the discharge side of said refrigerant impeller to the end of the motor remote from the pump, means in said motor for conducting refrigerant liquid through the motor to cool and lubricate the motor, and means for conducting refrigerant through the end wall to the suction side of said refrigerant impeller.

References Cited
UNITED STATES PATENTS

| 3,132,493 | 5/1964 | Peckham et al. | 62—483 |
| 3,178,904 | 4/1965 | Andersen | 62—483 |
| 3,296,823 | 1/1967 | Novak et al. | 62—476 |

LLOYD L. KING, Primary Examiner

U.S. Cl. X.R.

62—483